(12) United States Patent
Bernt et al.

(10) Patent No.: US 8,056,946 B2
(45) Date of Patent: Nov. 15, 2011

(54) FRONT PART FOR A MOTOR VEHICLE BODY

(75) Inventors: Volker Bernt, Trebur (DE); Rolf Ewert, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/833,484

(22) Filed: Jul. 9, 2010

(65) Prior Publication Data

US 2011/0181062 A1  Jul. 28, 2011

(30) Foreign Application Priority Data

Jul. 10, 2009  (DE) .......................... 10 2009 032 592

(51) Int. Cl.
 *B60R 19/02* (2006.01)
(52) U.S. Cl. ....................................................... 293/102
(58) Field of Classification Search .................. 293/102, 293/115
 See application file for complete search history.

(56) References Cited

U.S. PATENT DOCUMENTS

| 5,141,282 A * | 8/1992 | Fujiwara ..................... 296/193.1 |
| 5,503,444 A * | 4/1996 | Rouse et al. ................... 293/115 |
| 2007/0127257 A1* | 6/2007 | Erion et al. .................... 362/547 |
| 2007/0182171 A1* | 8/2007 | Kageyama et al. ........... 293/102 |
| 2009/0039674 A1* | 2/2009 | Hassdenteufel et al. ... 296/180.1 |

FOREIGN PATENT DOCUMENTS

| DE | 4132570 A1 | 4/1993 |
| DE | 10352098 A1 | 6/2005 |
| DE | 60307584 T2 | 8/2007 |
| DE | 102007047676 A1 | 4/2009 |

* cited by examiner

*Primary Examiner* — Lori Lyjak
(74) *Attorney, Agent, or Firm* — Ingrassia Fisher & Lorenz, P.C.

(57) ABSTRACT

A front part of a motor vehicle body includes, but is not limited to a bumper, a bumper bracket, and a fresh air channel. At least one movable closure element is situated in the fresh air channel to modulate its throughput. The bumper bracket forms a wall of the fresh air channel.

5 Claims, 2 Drawing Sheets

FRONT PART FOR A MOTOR VEHICLE BODY

CROSS-REFERENCE TO RELATED APPLICATION

This application claims priority to German Patent Application No. 102009032592.1, filed Jul. 10, 2009, which is incorporated herein by reference in its entirety.

TECHNICAL FIELD

The present invention relates to a front part of a motor vehicle body.

BACKGROUND

In recent times, it has become increasingly typical to attach a controllable closure element, also referred to as a shutter, to a fresh air channel of such a vehicle body front part, via which the engine is supplied with cooling and/or combustion air, which allows the throughput of the fresh air channel to be modulated. If the throughput is kept low at low engine temperature, for example, the engine can be brought more rapidly to a stationary operating temperature. The phase of low engine temperature immediately after the start of the engine is thus shortened, and fuel savings may be achieved and the exhaust gas quality may be improved.

The advantages of such a shutter are opposed by the disadvantage that it increases the weight of the motor vehicle and thus results in increased fuel consumption.

In addition, in case of a collision, it changes the crumple behavior of the vehicle body front part. While in the event of a collision with a heavy obstruction, additional stiffening of the front part by the shutter can be advantageous, the shutter can cause other problems in the event of accidents. Because it is typically installed directly adjoining the bumper, in order to ensure that fresh air passing through it is completely introduced into the channel, on the one hand, and because there is little space available for the shutter in front of radiator and engine block, on the other hand, it is already affected in the initial phase of the deformation occurring in the case of a collision. This already increases the rigidity of the vehicle body and the mass of the components of the vehicle in the initial phase of the collision.

It is therefore desirable to minimize the weight of a vehicle body front part having controllable closure element. In addition, other desirable features and characteristics will become apparent from the subsequent summary and detailed description, and the appended claims, taken in conjunction with the accompanying drawings and this background.

SUMMARY

It is proposed according to an embodiment of the invention under this aspect, in the case of a front part of a motor vehicle body having a bumper and a bumper bracket and having a fresh air channel, in which at least one movable closure element for modulating the throughput of the fresh air channel is situated, to form a wall of the fresh air channel by the bumper bracket itself.

In order to delimit the fresh air channel on its entire periphery, a bow connected at two ends to the bumper bracket can additionally be provided.

According to a particularly simple and cost-effective solution, the bumper bracket and the bow are adapted to form an integral frame.

An intended breakpoint can be provided between the bumper bracket and at least one end of the bow, which is designed to be destroyed already in the case of a slight collision. The bumper bracket can thus give way under the force of the collision and yield into the interior of the vehicle body, without carrying along the bow. As long as the bow is not accelerated during the collision, it also does not increase the momentum.

The bumper bracket and the bow may have interlocking guide elements extending in the vehicle longitudinal direction, in order to allow a movement of the bumper bracket relative to the bow in case of a frontal collision, while in contrast in the case of a deformation in the lateral direction, the bow is carried along by the bumper bracket and thus contributes to the deformation resistance of the vehicle body.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
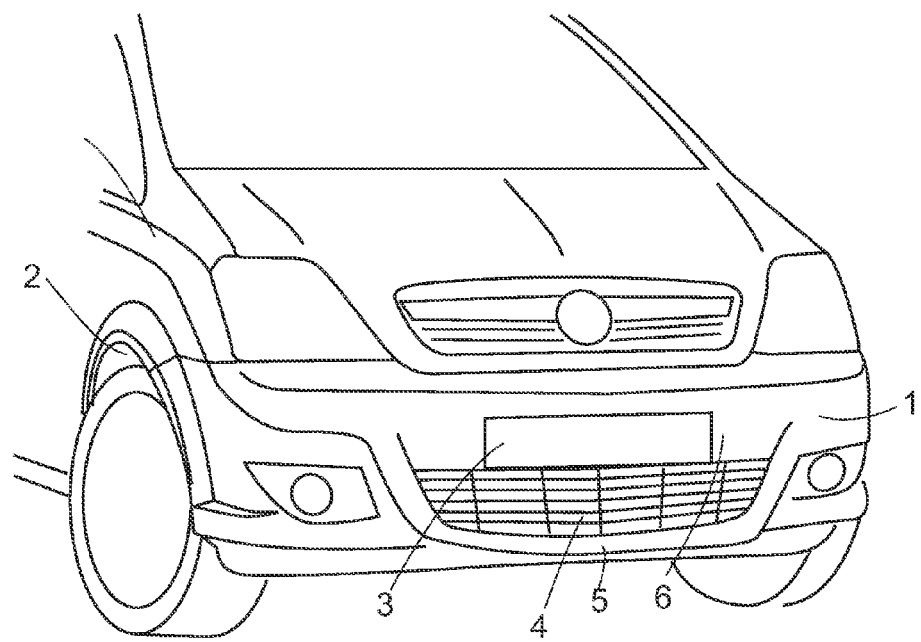
FIG. 1 shows a schematic perspective view of a front part of a motor vehicle body.

FIG. 1 shows a front part of a motor vehicle body, on which the present invention is usable. A yielding, shell-like bumper 1, which is molded from plastic, extends over the entire width of the vehicle front from one wheel well 2 to the other. An inlet opening 4 for cooling and combustion air is left out below a license plate panel 3 on the bumper 1. A lower crossbeam 5 below the inlet opening 4 forms the area of the bumper 1 and the entire vehicle body front part protruding furthest forward; an upper crossbeam 6, which carries the license plate panel 3, is slightly recessed relative thereto.

Figure 2:
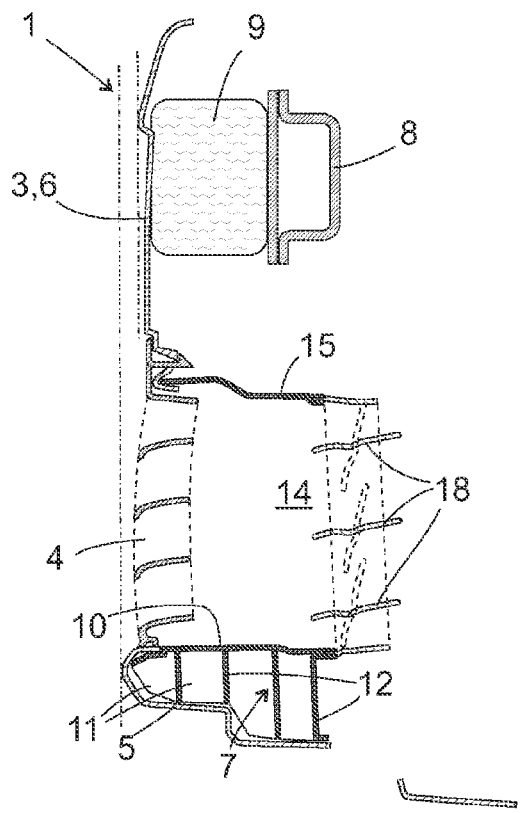
FIG. 2 shows a schematic partial section through the vehicle body front part of FIG. 1.

As the section of FIG. 2 shows, the bumper 1 is supported in the interior by a lower bumper bracket 7, which engages in a rear opening of the lower crossbeam 5, and an upper bumper bracket 8, which extends behind the upper crossbeam 6. The upper bumper bracket 8 comprises a steel profile, which is only deformable with a high introduction of energy. An easily deformable layer made of hard foam 9 is located between the steel profile and the bumper 1. The lower bumper bracket 7 is a molded part made of plastic of low weight and can be deformed more easily than the upper bumper bracket 8. The hard foam layer 9 and the lower bumper bracket 7 are provided to be deformed in the case of a collision, while the upper bumper bracket 8 is only to be affected in the case of a higher-energy collision, for example, with a second vehicle.

Figure 3:
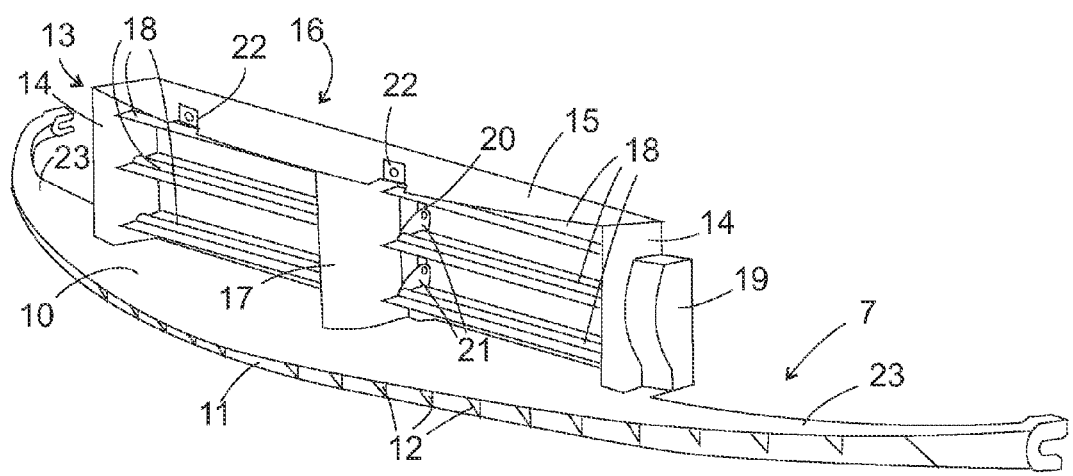
FIG. 3 shows a perspective view of a shutter having integral frame with a bumper bracket according to an embodiment of the present invention.

The lower bumper bracket 7 shown in detail in FIG. 3 comprises an essentially horizontal base plate 10, which is essentially flat on its top side, but is stiffened on the bottom side by ribs 11 or 12 running in the longitudinal or transverse directions of the vehicle. A middle area of the base plate 10 forms one of four flanks of an essentially rectangular frame 13 adjoining the inlet opening 4. Lateral flanks 14 and an upper flank 15 are implemented in the form of a three-sided bow 16 standing on the base plate 10. The inlet opening 4 and the frame 13 adjoining thereon form a fresh air channel, via which an engine lying behind it and its radiator are supplied with combustion air or cooling air.

Two groups of three butterfly valves 18 each are suspended so they are pivotable between the lateral flanks 14 and a central support wall 17 of the bow 16. A servomotor 19 for controlling the position of the valves 18 and thus for controlling the throughput of the fresh air channel is installed on one of the lateral flanks 14 and engages on the axis of a middle one of the valves 18. The position of the remaining valves 18 is controlled via a coupling rod 20, which is situated in the shadow of the support wall 17 and connects actuating levers 21 of the six valves 18 to one another.

Tabs 22 for fastening on the upper bumper bracket 8 are implemented on the upper flank 15 of the bow 16.

Because the frame 13 directly adjoins the edges of the inlet opening 4, it must immediately yield like the lower bumper bracket 7, even if the bumper 1 is only slightly deformed in the case of a light collision. It is important to minimize the total weight of all yielding parts. A substantial weight reduction is achieved by the double function of the base plate 10, on the one hand, as part of the frame 13 of the fresh air channel and, on the other hand, as an essential structural element of the lower bumper bracket 7. A further weight reduction is made possible by the suspension of the lower bumper bracket 7 on the upper bumper bracket 8 via the tabs 22. Because of this suspension, it is not necessary for arms 23 of the lower bumper bracket 7, which protrude laterally beyond the frame 13, and support it in a way known per se via crash boxes or the like on a support structure of the vehicle body, to be capable of bearing the entire weight of the lower bumper bracket 7 including the bow 16 and the valves 18. On the other hand, the fastening on the upper bumper bracket 8 via the tabs 22 forces a pivot movement of the bumper bracket 8 around a horizontal axis running through the tabs 22 when yielding, whereby the arms 23 are not only deformed in the horizontal in the case of a collision, but rather are also loaded with torsion. Therefore, a relatively low wall thickness of the base plate 10 and the ribs 11 and 12 stiffening it is sufficient in order to absorb a given impact energy, which allows a further weight savings.

Figure 4:
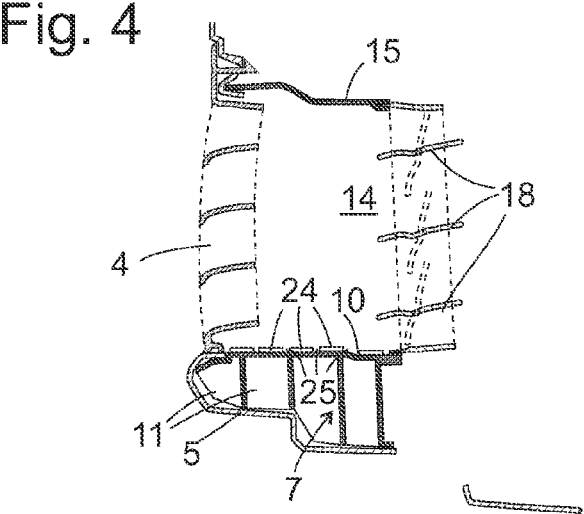
FIG. 4 shows a section similar to FIG. 3 according to a second embodiment of the invention.
Figure 5:
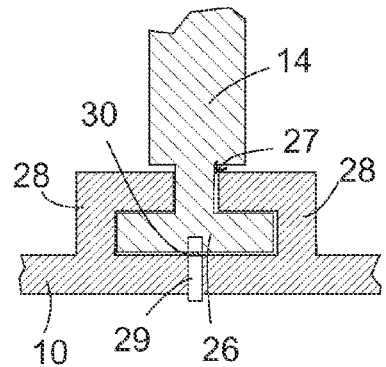
FIG. 5 shows a section in the vehicle transverse direction through a connection between bumper bracket and bow according to a third embodiment of the invention.

FIG. 4 shows an altered embodiment of the vehicle body front part in a section similar to FIG. 5. According to this alteration, multiple narrow openings 24 are formed in each case on the base of the two lateral flanks 14, where they merge into the base plate 10, so that the connection between the lateral flanks 14 and the base plate 10 is reduced to narrow webs 25 remaining between the openings 24. The lower crossbeam 5 of the bumper 1 protrudes somewhat further forward than the upper crossbeam 6 and therefore first comes into contact in the case of a collision. Because the base plate 10 extends up to directly behind the front most point of the lower crossbeam 5, the lower bumper bracket 7 must also yield immediately when the lower crossbeam 5 is indented. The carrying capacity of the webs 25 is dimensioned so that in such a situation, the inertia of the bow 16 is sufficient to cause them to tear, so that the base plate 10 can yield under the bow 16, without carrying it along. As a result, only the lower crossbeam 5 and the lower bumper bracket 7 are immediately accelerated. The mass of the accelerated parts of the vehicle is therefore low, and the momentum transfer is also low and only increases with progressing deformation of the front areas of the motor vehicle body.

According to a third embodiment of the invention, the bow 16 and the lower bumper bracket 7 are not integrally connected as in the case of the two previously considered embodiments, but rather are manufactured as separate molded parts in injection molding and are assembled into the form shown in FIG. 2. Lower crossbeam 5 and bow 16 are connected to one another via guide rails oriented in the vehicle longitudinal direction, which are shown in a plane perpendicular to the vehicle longitudinal direction in a section in FIG. 5. The lateral flanks 14 of the bow 16 are implemented on their lower ends as runners 26 of T-shaped cross-section and positively engage in an undercut groove 27, which is laterally delimited by two L-profiles 28 molded onto the top side of the base plate 10. Base plate 10 and lateral flanks 14 are fixed on one another, e.g., by pins 29, which are inserted into aligned holes of the base plate 10 and the flanks 14. The pins 29 are loaded in the vehicle longitudinal direction and break at intended breakpoints 30, whereby the lower bumper bracket 7 can yield without carrying along the bow 16. However, if an impact occurs in the lateral direction, resulting forces act between the lower bumper bracket 7 and the bow 16 transversely to the groove 27. In this case, there is no shift of the lower bumper 7 relative to the bow 16, and the latter contributes fully to the rigidity of the vehicle body front part.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A front part of a motor vehicle body, comprising:
 a bumper;
 a bumper bracket for the bumper;
 a fresh air channel having a wall formed by the bumper bracket;
 at least one movable closure element situated in the bumper bracket that is adapted to modulate a throughput of the fresh air channel.

2. The front part according to claim 1, wherein the bumper bracket and a bow that is connected at two ends to the bumper bracket are adapted to delimit the fresh air channel on an entire periphery.

3. The front part according to claim 2, wherein the bumper bracket and the bow are adapted to form an integral frame.

4. The front part according to claim 2, further comprising an intended breakpoint between the bumper bracket and at least one end of the bow.

5. The front part according to claim 2, wherein the bumper bracket and the bow comprise an interlocking guide element extending in a vehicle longitudinal direction.

\* \* \* \* \*